United States Patent Office 3,654,354
Patented Apr. 4, 1972

3,654,354
PROCESS FOR THE OXIDATION OF
UNSATURATED HYDROCARBONS
Jean Blanc, Pau, France, assignor to Societe Nationale
des Petroles d'Aquitaine, Paris, France
No Drawing. Filed June 4, 1968, Ser. No. 734,233
Claims priority, application France, June 5, 1967,
109,172
Int. Cl. C07c 57/04
U.S. Cl. 260—533 N    10 Claims

ABSTRACT OF THE DISCLOSURE

Oxidation of ethylenically unsaturated hydrocarbons by passage over a supported catalyst, the active substituent of which is phospho-vanado-molybdic acid or an ammonium, antimony or tellurium salt of such acid.

FIELD OF THE INVENTION

The present invention relates to the oxidation of unsaturated hydrocarbons to form the corresponding $\alpha,\beta$-unsaturated monocarboxylic acids, by means of an improved catalyst. One very important practical application of this invention is the conversion of propylene or isobutylene into $\alpha,\beta$-unsaturated monocarboxylic acids.

BACKGROUND OF THE INVENTION

The majority of the processes which can be applied to the production of unsaturated monocarboxylic acids from corresponding olefins comprise two steps. In a first step, a catalyst permits the corresponding unsaturated aldehyde to be obtained and, in a second step, another catalyst transforms this aldehyde into the corresponding acid.

A certain number of catalysts are known which permit of carrying out the oxidation of an unsaturated hydrocarbon into the corresponding unsaturated monocarboxylic acid in a single step. The yields of acid obtained by this oxidation are generally very small. In addition, if the oxidation is continued still further, for example by increasing the period of contact, a very high proportion of combustion or decomposition products ($CO$, $CO_2$, etc.) are obtained. However, the catalysts based on phosphomolybdic acid, as used in the processes described in French Pats. 1,320,461, 1,342,962 and 1,433,572, enable the monocarboxylic acid to be obtained with an interesting yield. However, these catalysts, obtained from phosphomolybdic acid, combined particularly with oxides of other metals, such as arsenic, lithium, antimony and tellurium, are generally less stable at the temperatures of the order of 450° C. at which they are employed, and have a tendency to decompose. Furthermore, after a treatment at such a temperature, it seems that the phosphomolybdate anion is decomposed into a mixture of oxides, and an analysis by X-ray diffraction of the catalyst results in the appearance of the lines corresponding to molybdenum oxide.

The research which has led to the present invention has made it possible to indicate a catalyst of which the fragility at high temperature is appreciably reduced and which has a a prolonged life under the operating conditions at high temperature. This catalyst also makes possible a conversion, with good yields and a decidedly limited contact time, of unsaturated hydrocarbons into the corresponding non-saturated acids, with the generally greatly reduced concurrent formation of aldehydes. In addition, even when the oxidation is continued a little too far, contrary to what happens with other catalysts, the quantity obtained of combustion or decomposition products remains extremely small. This catalyst also has the advantage of permitting an oxidation at temperatures slightly lower than those of the oxidation processes as so far known.

SUMMARY OF THE INVENTION

The present invention for the oxidation of ethylenic hydrocarbons, particularly those having 3 or 4 carbon atoms, e.g., propylene or isobutylene, to form the corresponding $\alpha,\beta$-unsaturated monocarboxylic acids consists in causing the hydrocarbon and oxygen to react in the presence of a catalyst system containing phosphorus, vanadium and molybdenum elements in the form of a heteropolyanion of phospho-vanado-molybdenum.

It has thus been possible to provide a catalyst which is not decomposed at high temperature into molybdenum and vanadium oxides and which consequently cannot be compared with a catalyst mass formed either of a mixture of oxides or of phosphomolybdic acid or of phosphomolybdate to which vanadium oxide has been added.

According to one preferred form of the invention, the cation fixed on the heteropolyanion is $H+$, $NH_4+$, $Sb^{3+}$, $Te^{4+}$, $Te^{6+}$. In the case of the ammonium salt of the phospho-vanado-molybdate, the active catalyst material has the formula $(NH_4)_{16}P_2V_{16}Mo_{14}O_{95}$. Preferably, the active catalyst is supported in known manner, e.g., on a silica support.

The oxidation is preferably carried out between about 350° and 500° C., and while maintaining the time of contact between the reactants and the catalyst system at from about 0.5 to 15 seconds. It is evident that the contact times depend on the temperature at which one is working.

According to one particularly preferred feature of the invention, the oxidation is carried out in the presence of a tellurium phospho-vanado-molybdate catalyst system, while maintaining the reaction mixture at temperatures between 380° and 400° C. and providing olefin-catalyst contact times of from 6 to 12 seconds. In accordance with a second particularly preferred embodiment, the oxidation may be carried out in the presence of antimony phospho-vanado-molybdate, while maintaining reaction temperatures of from 430° to 450° C. and catalyst contact times of from 0.9 to 1.5 seconds.

PREFERRED EMBODIMENTS OF THE INVENTION

The invention is illustrated by the following examples, given in non-limiting manner, and intending to prove the increase in the selectivities of $\alpha,\beta$-unsaturated carboxylic acids, when the catalyst contains the phosphorus, molybdenum and vanadium elements in the form of phospho-vanado-molybdic heteropolyanion, by comparison with the known catalysts, particularly based on a phosphomolybdic anion.

One preferred method of preparing the catalyst system according to the invention, and given as a non-limiting example, is the following: ammonium phospho-vanado-molybdate is added to a silica sol containing 5 to 10% of $SiO_2$. This is dried in an oven at 120° C. for 24 hours and calcined at 450° for once more 24 hours. The powder obtained, compressed with 5% of cellulose powder, is ready for being used.

Examples 1 and 2

The operation takes place at 380° C., propylene and oxygen being introduced with a $C_3H_6/O_2$ ratio by volume equal to 1. The contact time is 6 seconds.

The catalyst A (Example 1) contains:

50% of phosphomolybdic acid,
50% of silica.

The catalyst B (Example 2) contains:

50% of ammonium phosphovanadomolybdate
50% of silica.

The specific surfaces of the catalysts A and B are respectively 173.8 and 159.5 m.²/g.

| Catalyst | Example 1 | Example 2 |
|---|---|---|
|  | A; (P, Mo) | B; (P, Mo, V) |
| Conversion of propylene, percent | 44 | 43.5 |
| Selectivity percent: acrolein acrylic acid | 5.5:1 | 15:5 |
| Acrylic acid, percent (acrylic acid plus acrolein) | 15.4 | 25 |

The other compounds obtained are acetone, acetaldehyde, acetic acid, formaldehyde and the oxides of carbon. The comparison of the yields of acrylic acid with respect to the weight of acrylic acid and acrolein obtained shows that the phosphovanadomolybdic heteropolyanion, when operating under identical conditions, leads to almost twice the yield, the selectivity as regards acrylic acid being increased five times.

The selectivities are in this case relatively small, but the improvement is clearly apparent, because the selectivity as regards acrolein has increased less in proportion to the selectivity as regards acrylic acid.

Examples 3 to 7

The operation takes place at 440° C., the $C_3H_6/O_2$ ratio by volume being 1, and the partial water pressure being 0.2 atm.

The catalyst C (Examples 3 and 4) contains:

35% of phosphomolybdic acid,
35% of antimony oxide ($Sb_2O_3$),
30% of silica.

The catalyst D (Examples 5 to 7) contains:

35% of ammonium phosphovanadomolybdate,
35% of antimony oxide
30% of silica.

The times of contact between propylene and oxygen and catalyst composition are respectively 0.9, 1.5 and 2.5 seconds (Examples 5, 6 and 7).

The following table permits a comparative study:

|  | Catalyst | | | | |
|---|---|---|---|---|---|
|  | C; (P, Mo, Sb) | | D; (P, Mo, V, Sb) | | |
| Example | 3 | 4 | 5 | 6 | 7 |
| Contact time (seconds) | 3 | 6 | 0.9 | 1.5 | 2.5 |
| Conversion propylene, percent | 20.5 | 30 | 34.5 | 42 | 45 |
| Selectivity percent: acrolein acrylic acid | 22.5:5 | 18:7.5 | 54:13.5 | 25:24.5 | 24:24 |
| Acrylic acid, percent (acrylic acid plus acrolein) | 18.2 | 23.4 | 22.9 | 49 | 50 |

These examples not only make it possible to confirm the influence of the catalyst based on phosphovanadomolybdate as compared with the catalyst based on phosphomolybdate, but also show the importance of the time factor.

Thus, in order that the same proportion of 30% of propylene is converted, it is necessary to have a contact time of 6 seconds with catalyst C, while less than 0.9 second is sufficient with catalyst D. It is also seen that the conversion of propylene, on changing from a contact time of 0.9 second to 1.5 seconds, in the case of catalyst D, is only increased by about 20% for a practically doubled acrylic acid selectivity and a formation of acrolein reduced by about half.

Examples 8 and 9

The operation takes place under the same conditions as in Examples 1 and 2, but the contact time is brought to 10 seconds.

Catalyst E contains:

35% of phosphomolybdic acid,
35% of telluric acid,
30% of silica, and catalyst F contains:

35% of ammonium phosphovanadomolybdate,
35% of telluric acid,
30% of silica.

| Catalyst | Example 8 | Example 9 |
|---|---|---|
|  | E; (P, Mo, Te) | F; (P, Mo, V, Te) |
| Conversion of propylene, percent | 66.5 | 65.5 |
| Selectivity percent: acrolein acrylic acid | 58:13 | 47:27.5 |
| Acrylic acid, percent (acrylic acid plus acrolein) | 18.3 | 36.9 |

These examples show that the proportion of acrylic acid with respect to the quantity of acrylic acid and acrolein obtained is doubled when ammonium phosphovanadomolybdate is used.

Furthermore, an X-ray analysis of the catalyst F, after the oxidation, shows the absence of molybdenum oxide and vanadium oxide phases, whereas after the same treatment, the catalyst E is again found in the form of oxides.

As well as acrylic acid and acrolein, there are formed combustion or decomposition products, such as CO, $CO_2$, etc.

It is completely surprising to find that the catalysts based on the phosphovanadomolybdate anion not only lead to a higher selectivity as regards acrylic acid, but also lead to obtaining a much smaller proportion of combustion or decomposition products than the catalysts as hitherto known.

It is obvious that the invention is not in any way limited to the examples described; it is capable of numerous other variants available to the person skilled in the art, according to the applications which are envisaged, without thereby departing from the scope of the invention.

I claim:

1. A method for the production of ethylenically unsaturated alpha, beta-monocarboxylic acids having 3 or 4 carbon atoms, which comprises contacting a gaseous olefin having 3 or 4 carbon atoms with oxygen and with a catalyst consisting essentially of a supported phosphovanado-molybdic hetero anion-containing compound selected from the group consisting of

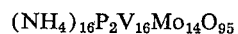
$(NH_4)_{16}P_2V_{16}Mo_{14}O_{95}$ $(NH_4)_{16}P_2V_{16}Mo_{14}O_{95}$ and antimony oxide, and

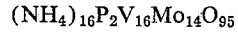
$(NH_4)_{16}P_2V_{16}Mo_{14}O_{95}$ and telluric acid, while maintaining the reaction mixture at temperatures within the range of 350° to 500° C. and providing olefin-catalyst contact times of from 0.5 to 15 seconds, and recovering the monocarboxylic acid thus formed from the effluent reaction mixture.

2. The method of claim 1 wherein the catalyst has been calcined.

3. The method according to claim 1, wherein said olefin is propylene.

4. The method according to claim 1, wherein said olefin is isobutylene.

5. The mthod according to claim 1, wherein said catalyst comprises from 90 to 25 parts by weight of

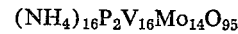
$(NH_4)_{16}P_2V_{16}Mo_{14}O_{95}$ and telluric acid and from 10 to 75 parts by weight of a silica support, and wherein the olefin-catalyst contact time is maintained at from 6 to 12 seconds.

6. The method according to claim 5, wherein said olefin is propylene.

7. The method according to claim 5, wherein said olefin is isobutylene.

8. The method according to claim 1, wherein said catalyst comprises from 90 to 25 parts by weight of

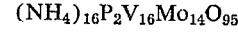
$(NH_4)_{16}P_2V_{16}Mo_{14}O_{95}$ and antimony oxide, and from 10 to 75 parts by weight of a silica support, and wherein the olefin-catalyst contact time is maintained at from 0.9 to 1.5 seconds.

9. The method according to claim 8, wherein said olefin is propylene.

10. The method according to claim 8, wherein said olefin is isobutylene.

References Cited

UNITED STATES PATENTS

| 3,322,693 | 5/1967 | Bethell et al. | 260—533 N |
|---|---|---|---|
| 3,435,064 | 3/1969 | Bethell et al. | 260—533 N |
| 3,457,303 | 7/1969 | Eden | 260—533 N |

FOREIGN PATENTS

| 7,522 | 3/1967 | Japan | 260—533 N |

JAMES A. PATTEN, Primary Examiner

R. D. KELLY, Assistant Examiner

U.S. Cl. X.R.

252—437; 260—604 R